United States Patent Office 3,374,057
Patented Mar. 19, 1968

3,374,057
PROCESS FOR ION EXCHANGING CRYSTALLINE ZEOLITES WITH NITROGENOUS BASES
Carl V. McDaniel, Laurel, and Philip K. Maher, Baltimore, Md., assignors to W. R. Grace & Co., New York, N.Y., a corporation of Connecticut
No Drawing. Filed Sept. 27, 1965, Ser. No. 490,685
3 Claims. (Cl. 23—112)

This invention relates to a new, improved process for exchanging crystalline zeolites with nitrogenous bases.

In summary, this invention is an improvement of the process of nitrogen base exchange of a crystalline zeolite having an alkali metal content of less than about 3 percent, expressed as the alkali metal oxide, the improvement comprising maintaining in a solution containing the nitrogen base, an aluminum ion concentration greater than 3 percent and preferably greater than 5 percent, expressed as aluminum sulfate, and thereby protecting the crystalline structure of the zeolite from degradation during the base exchange process.

Crystalline zeolites are crystalline metal aluminosilicates having a highly ordered arrangement of alumina and silica tetrahedra which are interconnected through shared oxygen atoms. The spaces between the tetrahedra are occupied by water molecules prior to the dehydration. Dehydration results in crystals interlaced with channels of molecular dimensions. These offer very large surface areas for the adsorption of foreign molecules provided the crystalline structure remains intact so that the opens into the internal adsorption areas are retained.

The electrovalence of the alumina in the structure is balanced by the inclusion of a cation in the crystal. In synthetic zeolitic molecular sieves the cation is most commonly an alkali metal such as sodium and potassium or mixtures thereof. The cations of either the synthetic or natural occurring zeolite can be exchanged for other mono-, di- or trivalent cations which have a suitable physical size and configuration to diffuse into the intracrystalline passages in the aluminosilicate structure.

The substitution of the original cations of the aluminosilicate with hydrogen cations by acid or water leaching has been heretofore known in the art. In addition, the introduction of hydrogen cations as substitutes for the metal cations has also been accomplished heretofore by ion exchanging the metal cations with nitrogenous bases and thereafter thermally treating the nitrogenous base exchanged form to liberate the nitrogenous base leaving the zeolite in the hydrogen exchanged form. The hydrogen exchanged aluminosilicates have utility as promoters in petroleum cracking catalysts after their structure has been stabilized. Stabilization can be obtained, for example, by further ion exchange to include stabilizing rare earth ions.

However, serious difficulties have been encountered in the exchange of crystalline zeolites with nitrogenous bases. Degradation of the crystalline structure of the zeolite when the zeolite, having an alkali metal content of less than about 3 percent expressed as the alkali metal oxide, has been exchanged with nitrogenous bases has been observed. This impairment of the crystal structure in the base exchange operation produces a zeolite which has a diminished activity as a cracking catalyst promoter.

It is an object of this invention to provide an improved process for exchanging crystalline zeolites with nitrogenous bases wherein the crystalline structure of the zeolite is protected during the exchange.

Examples of the synthetic crystalline zeolites which can be exchanged with nitrogen bases by the improved process of this invention are shown in Table A.

TABLE A

| Zeolite | Oxide Mole Ratios (shown as alkali metal oxide form) | Patent Disclosure |
|---|---|---|
| Zeolite X | $1.0\pm0.2Na_2O:Al_2O_3:2.5\pm0.5SiO_2:0-8H_2O$ | U.S. 2,882,244. |
| Zeolite Y | $0.9\pm0.2Na_2O:Al_2O_3:3-6SiO_2:0-9H_2O$ | U.S. 3,130,007. |
| Zeolite A | $1.0\pm0.2Na_2O:Al_2O_3:1.85\pm0.5SiO_2:0-6H_2O$ | U.S. 2,882,243. |
| Zeolite L | $1.0\pm0.1Na_2O:Al_2O_3:6.4\pm0.5SiO_2:0-7H_2O$ | Bel. 575,117. |
| Zeolite D | $0.9\pm0.2[(0-1)Na_2O:(1-0)K_2O]:Al_2O_3:4.5-4.9SiO_2:0-7H_2O$ | Can. 611,981. |
| Zeolite R | $0.9\pm0.2Na_2O:Al_2O_3:2.45-3.65SiO_2:0-7H_2O$ | U.S. 3,030,181. |
| Zeolite S | $0.9\pm0.2Na_2O:Al_2O_3:4.6-5.9SiO_2:0-7H_2O$ | U.S. 3,054,657. |
| Zeolite T | $1.1\pm0.4[(0.1-0.8)Na_2O:(0.9-0.2)K_2O]:Al_2O_3:6.9\pm0.5SiO_2:0-8H_2O$ | U.S. 2,950,952. |
| Zeolite Z | $K_2O:Al_2O_3:2SiO_2:0-3H_2O$ | Can. 614,995. |
| Zeolite E | $0.9\pm0.1Na_2O:Al_2O_3:1.95\pm0.1SiO_2:0-4H_2O$ | Can. 636,931. |
| Zeolite F | $0.95\pm0.15Na_2O:Al_2O_3:2.05\pm0.3SiO_2:0-3H_2O$ | U.S. 2,996,358. |
| Zeolite O | $0.95\pm0.05Na_2O:Al_2O_3:12.2\pm0.05SiO_2:0-5H_2O$ | U.S. 3,140,252. |
| Zeolite B | $1.0\pm0.2Na_2O:Al_2O_3:3.5\pm1.5SiO_2:0-6H_2O$ | U.S. 3,008,803. |
| Zeolite Q | $0.95\pm0.05Na_2O:Al_2O_3:2.2\pm0.05SiO_2:XH_2O$ | U.S. 2,991,151. |
| Zeolite M | $1.0\pm0.1K_2O:Al_2O_3:2.0\pm0.1SiO_2:XH_2O$ | U.S. 2,995,423. |
| Zeolite H | $1.0\pm0.1Na_2O:Al_2O_3:2.0\pm0.1SiO_2:XH_2O$ | U.S. 3,010,789. |
| Zeolite J | $0.9\pm0.1K_2O:Al_2O_3:2.1\pm0.2SiO_2:XH_2O$ | U.S. 3,011,869. |
| Zeolite W | $1.0\pm0.1Na_2O:Al_2O_3:4.1\pm0.8SiO_2:YH_2O$ | U.S. 3,012,853. |
| Zeolite KG | $0.9-1.1Na_2O:Al_2O_3:2.3-4.2SiO_2:2.6-4.6H_2O$ | U.S. 3,056,654. |

Among the naturally occurring crystalline aluminosilicates which can be exchanged with nitrogeneous bases by the process of this invention are included levynite, dachiardite, erionite, faujasite, analcite, paulingite, noselite, ferriorite, heulandite, scolecite, stibite, clinoptilolite, harmotome, phillipsite, brewsterite, flakite, datolite, and aluminosilicates represented as follows:

Chabazite, $Na_2O \cdot Al_2O_3 \cdot 4SiO_2 \cdot 6H_2O$
Gmelinite, $Na_2O \cdot Al_2O_3 \cdot 4SiO_2 \cdot 6H_2O$
Cancrinite, $3(Na_2O \cdot Al_2O_3 \cdot 2SiO_2) \cdot Na_2CO_3$
Leucite, $K_2O \cdot Al_2O_3 \cdot 4SiO_2$
Lazurite, $(Na,Ca)_8Al_6Si_6O_2 \cdot 4.2(S,Cl,SO_4)$
Scapolite, $Na_4Al_3Si_9O_{24} \cdot Cl$
Mesolite, $Na_2O \cdot Al_2O_3 \cdot 3SiO_2 \cdot 2-3H_2O$
Ptilolite, $Na_2O \cdot Al_2O_3 \cdot 10SiO_2 \cdot 4H_2O$
Mordenite, $Na_2O \cdot Al_2O_3 \cdot 10SiO_2 \cdot 6.6H_2O$
Nepheline, $Na_2O \cdot Al_2O_3 \cdot 2SiO_2$
Natrolite, $Na_2O \cdot Al_2O_3 \cdot 3SiO_2 \cdot 2H_2O$
Sodalite, $3(Na_2O \cdot Al_2O_3 \cdot 2SiO_2) \cdot 2NaCl$ All concentrations are herein given in terms of weight percents unless otherwise specified.

For purposes of simplicity, the improved process of this invention will be shown with Type X and Type Y zeolites. The term "synthetic faujasite" is defined as including Type X and Type Y zeolites.

The nitrogen bases which can be employed in the process of this invention are compounds which decompose to provide hydrogen ions when an aluminosilicate treated with a solution of said ammonium compound is subjected to elevated temperatures below the decomposition temperature of the aluminosilicate.

Representative ammonium compounds which can be employed include ammonium chloride, ammonium bromide, ammonium iodide, ammonium sulfate, ammonium sulfide, ammonium thiocyanate, ammonium dithiocarbamate, ammonium peroxysulfate, ammonium acetate, ammonium tungstate, ammonium hydroxide, ammonium molybdate, ammonium benzoate, ammonium borate, ammonium carbamate, ammonium sesquicarbonate, ammonium chloroplumbate, ammonium citrate, ammonium dithionate, ammonium fluoride, ammonium gallate, ammonium nitrate, ammonium nitrite, ammonium formate, ammonium propionate, ammonium butyrate, ammonium valerate, ammonium lactate, ammonium malonate, ammonuim oxalate, ammonium palmitate, ammonium tartrate, and the like. Still other ammonium compounds which can be employed include tetraalkyl and tetraaryl ammonium salts such as tetramethylammonium hydroxide, trimethylammonium hydroxide. Other compounds which can be employed include the salts of guanidine, pyridine, quinoline, etc. The nitrogen base can be employed either alone or together with other exchangeable cations.

Advantages are also obtained in the improved process of this invention when the exchangeable cations do not include a nitrogen base. However, the principal advantages are obtained during exchange processes with solutions containing nitrogen bases.

Nitrogen base exchange of the crystalline zeolites can be effected by a batch-wise type ion exchange wherein the zeolite is slurried in an aqueous solution containing the nitrogen base. In addition, the exchange can be effected by a continuous technique wherein a solution containing the nitrogen base is passed over a column containing the zeolites such that the effluent containing the formed salt is continuously removed. As a consequence thereof, the ion exchange equilibrium is continuously upset.

The improved process of this invention comprises maintaining in the nitrogen base exchange solution an aluminum ion concentration of greater than 3 percent and preferably greater than 5 percent, expressed as aluminum sulfate, whereby the crystalline structure of the zeolites is protected from degradation during the base exchange process. This technique is most advantageous when the crystalline zeolite has an alkali metal content of less than 3 percent expressed as the alkali metal oxide, for at these low ranges, degradation of the crystalline structure is most likely to occur. The preferred concentration of aluminum ions in the nitrogen base exchange solution is greater than 7 percent, expressed as aluminum sulfate.

Any soluble aluminum compound which will provide aluminum ions in the exchange solution can be employed. The preferred compound is aluminum sulfate because of its low cost. Examples of other aluminum salts which can be employed include aluminum chloride, nitrate, and the like.

After the exchange with the nitrogen base, the crystalline zeolite is washed with water.

A measure of degradation of the crystalline structure is the loss of surface area of the exchanged product. The surface area of the exchanged crystalline zeolites are measured by the well-known Brunauer-Emmett-Teller [S. Brunauer, P. Emmett and E. Teller, J. Am. Chem. Soc., 60, 309 (1938)].

The improved method of this invention is further illustrated by the following specific but non-limiting examples.

*Example 1*

This example shows the loss of aluminum from synthetic faujasite during nitrogen base exchange when aluminum ions are not employed in the base exchange solution.

A 10,980.8 g. sample of a Type Y zeolite having a silica to alumina mole ratio of 4.8 and a sodium content, expressed as the oxide, of 13.33 wt. percent (dry basis) was placed in a solution of 1.938 g. ammonium chloride in 18,750 g. of water and heated to 100° C. for 2 hours. The zeolite was then filtered from the exchange solution, and the exchange step was repeated. The zeolite was then filtered from the solution, washed until chloride free with water, dried overnight at 240° F. and calcined at 1000° F. for 2 hours. A 20.0 g. sample of the calcined zeolite was then added to 19.76 g. of ammonium sulfate dissolved in 400 g. of water, heated for one hour at about 100° C. and filtered. This exchange step was repeated 2 times. The exchanged zeolite was then washed with water, dried at 120° C. for 25 minutes, and calcined at 1500° F. for 2 hours. Analysis showed that the product zeolite had a silica to alumina mole ratio of 5.25 and a sodium content, expressed as the oxide, of 0.2 wt. percent. The higher silica to alumina mole ratio resulted from the loss of aluminum from the zeolite structure.

A 209.2 g. sample of a Type Y zeolite having a silica to alumina mole ratio of 4.9 and a sodium content, expressed as the oxide, of 12.9 wt. percent (dry basis), was exchanged twice with a solution of 157.6 g. of ammonium sulfate in 621.6 g. of water as described above. The zeolite was filtered, washed, dried at 120° C. and calcined at 1500° F. A 30.0 g. portion of the zeolite was then added to 90.0 g. of ammonium sulfate in 495.0 g. of water and heated for 3 hours at 100° C. The exchanged zeolite was then filtered and contacted with an identical exchange solution on the filter having a temperature of 90° C. The zeolite was then washed, dried at 120° C., and calcined at 1500° F. Analysis showed that the product zeolite had a silica to alumina mole ratio of 5.2 and a sodium content, expressed as the oxide, of 0.2 wt. percent (dry basis).

*Example 2*

This example shows the protective influence of aluminum ions in an aqueous solution of a nitrogenous base with which synthetic faujasite is exchanged.

A Type Y zeolite to be base exchanged had the composition shown in Table B as Sample 1.

A 200 g. sample of the zeolite was placed in 200 g. of deionized water containing 200 g. of ammonium sulfate and 5 g. of aluminum sulfate. The solution temperature was 100° C. The zeolite was mixed with the solution for 30 minutes with stirring, and removed therefrom by filtration. This procedure was repeated for a total of 6 exchanges, and the final exchanged product was washed and dried at 110° C. The product was analyzed, and the chemical composition thereof is shown in Table B under Sample 2.

The procedure employed for producing Sample 2 was repeated except that the exchange solution contained 15 g. of aluminum sulfate. The analysis of the product is shown in Table B under Sample 3.

TABLE B

| Sample No. | 1 | 2 | 3 |
|---|---|---|---|
| Chemical analysis, wt. percent: | | | |
| Na₂O, d.b. | 13.7 | 0.3 | 0.1 |
| Al₂O₃, d.b. | 22.5 | 22.3 | 24.7 |
| SiO₂, d.b. | 63.90 | 74.9 | 73.6 |
| SiO₂/Al₂O₃ mole ratio | 4.8 | 5.7 | 5.0 |

As shown in Table B, loss of aluminum from the zeolite during base exchange thereof with the nitrogenous base was reduced when greater than 3 percent of aluminum ions was present in the exchange solution. It should also be noted that concentrations of aluminum ions of less than 3 percent increased the aluminum loss from the zeolite and further impaired the crystal structure of the zeolite.

Obviously, many modifications and variations of the invention as hereinabove set forth may be made without departing from the essence and scope thereof, and only such limitations should be applied as are indicated in the appended claims.

We claim:

1. In the process of nitrogen base exchange of synthetic faujasite having an alkali metal content of less than 3 percent, expressed as the alkali metal oxide, the improvement which comprises maintaining in a solution containing the nitrogen base, an aluminum ion concentration greater than 3 weight percent, expressed as aluminum sulfate, and thereby protecting the crystalline structure of the synthetic faujasite from degradation during the base exchange process.

2. The process of claim 1 wherein the nitrogen base includes an ammonia salt.

3. The process of claim 1 wherein the aluminum ion concentration is greater than 6 weight percent, expressed as aluminum sulfate.

References Cited

UNITED STATES PATENTS

| | | | |
|---|---|---|---|
| 3,130,006 | 4/1964 | Rabo et al. | 23—111 X |
| 3,140,249 | 7/1964 | Plank et al. | 252—455 X |
| 3,140,251 | 7/1964 | Plank et al. | 252—455 X |

EDWARD J. MEROS, *Primary Examiner.*